No. 621,076. Patented Mar. 14, 1899.
T. H. HABERKORN.
VALVE MECHANISM FOR AIR BRAKES.
(Application filed Dec. 31, 1897.)
(No Model.)
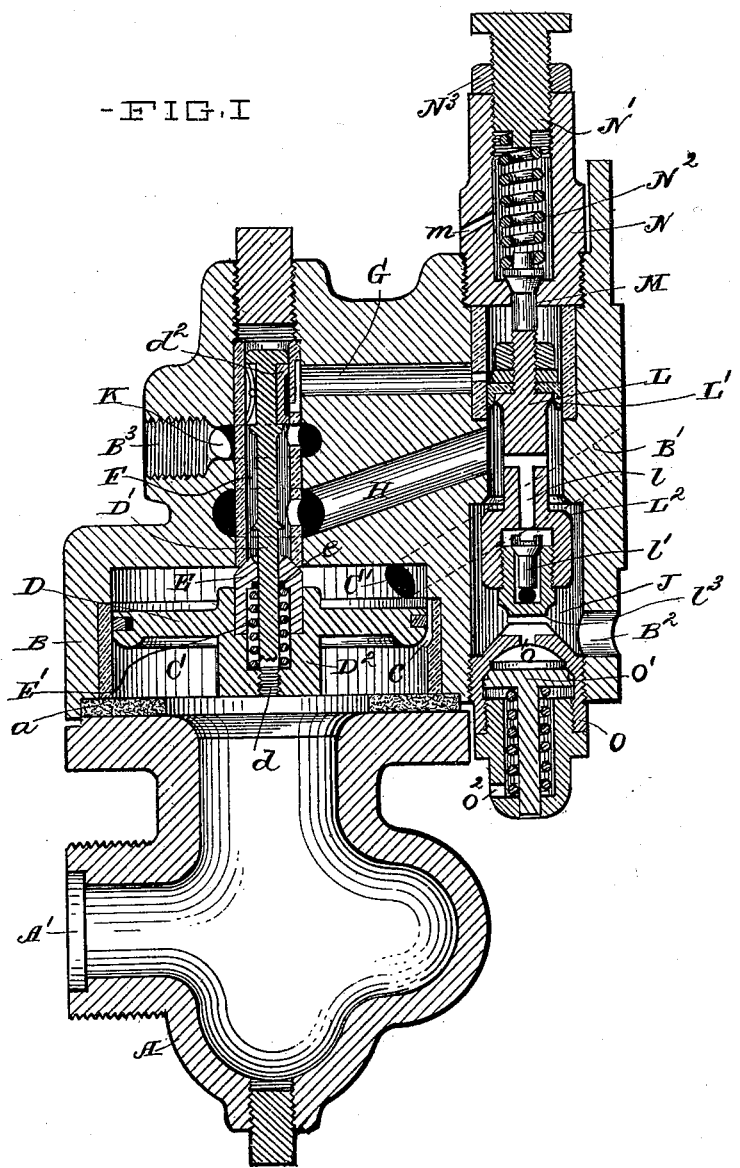
WITNESSES:
INVENTOR
Theodore H. Haberkorn
BY
ATTORNEYS.

UNITED STATES PATENT OFFICE.

THEODORE H. HABERKORN, OF FORT WAYNE, INDIANA.

VALVE MECHANISM FOR AIR-BRAKES.

SPECIFICATION forming part of Letters Patent No. 621,076, dated March 14, 1899.

Application filed December 31, 1897. Serial No. 664,861. (No model.)

*To all whom it may concern:*

Be it known that I, THEODORE H. HABERKORN, of Fort Wayne, in the county of Allen and State of Indiana, have invented certain new and useful Improvements in Valve Mechanism for Air-Brakes; and I do hereby declare the following to be a full, clear, and exact description of the invention, such as will enable others skilled in the art to which it pertains to make and use the same.

My invention relates to improvements in reinforcing air-brake valves or governors, and more especially to what are known as "automatic triple valves," wherein the parts are so arranged and located that the brake-cylinder is supplied with air under pressure from the auxiliary reservoir by reducing the pressure in the main air-pipe which is under the control of the engineer.

The object of this invention is to construct a valve mechanism which is especially adapted for use on high-speed trains, and can be used to "slow down," as in case of a "grade" or "service stop," or can be used to quickly and forcibly operate the brake, as in case of an "emergency stop." The power for operating the brakes in an emergency stop is obtained directly from the auxiliary reservoir, which acts, by means of my improved valve, to supply air to reinforce the pressure in the brake-cylinder at option of the operator.

Heretofore and before my invention it was not practical to apply the "emergency-brake" when the brake-cylinder was partly charged, as in the case of a slow down on approaching a switch or grade, because the emergency stop was accomplished by first admitting low main or train pipe pressure to the brake-cylinder, and this could not be done when the brake-cylinder was partly charged with air from the auxiliary reservoir, and hence this method of braking was unreliable, inasmuch as an emergency stop might be required during a slow down.

By the use of a valve or mechanism constructed according to my present invention all of the above-cited objections are avoided, as will be hereinafter set forth.

The drawing illustrates in vertical section a preferred construction of valve embodying my present invention, in which—

A represents a chambered casing which is provided with a suitable connection A' for attachment to the main air-pipe of the train.

B represents an upper casing which is provided with chambers and ports and contains the operating mechanism of the valve and is also provided with suitable openings or connections B' B$^2$ B$^3$ for allowing of communication with the auxiliary reservoir, brake-cylinder, and the exhaust or outer air, respectively. The opening or port B' for connection with the auxiliary reservoir is shown in dotted lines. These openings B' B$^2$ B$^3$ and also the opening or connection A' may be located according to convenience in manufacture or convenience in attaching them to their various pipes. The lower and upper casings A and B are suitably secured together by means of screws or bolts, (not shown,) and a proper gasket or packing $a$ is interposed between the two casings to make the joint air-tight.

C represents a chamber of such contour and size as to receive a piston D, which is adapted to operate therein.

D' represents a piston-stem which is secured at its lower end to the piston D, preferably by means of a screw-thread connection $d$, located in the bottom of the hollow hub D$^2$ of the piston.

E represents a hollow conical valve which is located in the bore of the hollow hub D$^2$ and surrounds the piston-stem D'. A spiral spring E', located between the bottom of hub D$^2$ and the valve E, acts to project said valve and forms a cushion for the piston D and also acts to keep the packing $e$ tightly packed around the stem D' at the top of valve E.

C' represents a port leading from the interior of chamber C and communicating with the auxiliary reservoir by suitable connection with the same. The port C' leads from the upper part of chamber C or that portion above the piston D.

$c$ represents a port formed in the wall of the chamber C and controlled by the piston D in its vertical movement in the chamber. This port $c$ forms the communicating passage between the main air-pipe and the auxiliary reservoir, and it is through this port $c$ that the charging of the said reservoir is controlled.

Extending upward from the center of the chamber C is a cylindrical passage-way F, the lower end of which is formed into a valve-seat and controlled by conical valve E. Valve-stem D' extends upward into the passage F and is provided at its upper end with a slide-valve $d^2$, which controls the opening leading to port G, the function of which will hereinafter appear.

H represents a port leading from passage F to the so-called "governor chamber or cylinder" J.

K represents the exhaust-port, which communicates with the passage F at its inner end and with the open air at its outer end.

L represents the governor-piston, which is provided at its lower end with a valve $L^2$, controlling the communication between port H and governor-chamber J, and thus controlling communication between the auxiliary reservoir and the brake-cylinder. The piston L is packed, as at L', at the upper end. The governor-piston L is also provided with a central port $l$, which has communication at its upper end with port H and is at its lower end governed by a pop-valve $l'$, operating in a chambered bushing or plug $l^3$, thus establishing or cutting off communication between the brake-cylinder and the port $l$, through which the exhaust from the brake-cylinder passes on its way to the open air.

M represents a spring-controlled pop-valve located and operating in the top of regulator-chamber J. This valve M is operated or opened by the upper end of regulator-piston L to allow of the escape of the air from above the said piston L through a small port $m$. The valve M and port $m$ are located in a hollow screw-threaded plug N, secured to the upper end of governor-chamber J. The upper end of hollow plug N is in turn screw-threaded internally and provided with an adjusting-screw N', which controls the tension of a spiral spring $N^2$. The spring $N^2$ at its lower end bears on the pop-valve M and keeps it to its seat until the said valve is opened by the upper end of the regulator-piston L, and thus also by its tension keeps the valve $L^2$ open. A lock-nut $N^3$ locks the screw N' when the same has been properly adjusted.

O represents a relief-valve of suitable construction located in the lower end of chamber J. This valve O is spring-controlled and acts to slowly relieve the surplus pressure from the brake-cylinder in case of an emergency brake or quick stop, the surplus air passing through port $o$, opening valve $o'$, and thence passing out through port $o^2$.

The operation of my valve or governor is as follows: Air from the main reservoir passes into the main or train pipe and from thence through opening A' into chamber A, from where it passes, with main-pipe pressure, into chamber C and forces the piston D upward. As the piston D is forced upward valve E, being projected upward from said piston by the spring E', closes the lower end of the passage F, thus cutting off communication therewith. The further pressure of the air from the main pipe forces the piston D still farther upward, thus opening the small port $c$ in the side of chamber C and allowing the air to flow to the upper part of chamber C and through port C' to the auxiliary reservoir. (Not shown.) The upward movement of the piston D also acts to increase the tension of the spring E' and thus close the valve E tighter and to open the exhaust-port K by raising the slide-valve $d^2$, located on the upper end of the stem D', thus in case the brake-cylinder is charged allowing the air to discharge from said cylinder to the open air through valve $l'$ and ports $l$, H, and K, the port G, communicating with the space above the regulator-piston L, being also closed by the slide-valve $d^2$ in its upward movement. The drawing illustrates the position of the parts, as just hereinbefore described, when the air from the main air-pipe is being charged to the auxiliary reservoir and the communication between the auxiliary reservoir and the brake-cylinder is cut off.

When the auxiliary reservoir is properly charged with compressed air and it is desired to apply the brake slightly for the purpose of slowing down, the air-pressure in the main pipe is reduced slightly, thus causing the greater air-pressure of the auxiliary reservoir to "back up" against the piston D and force it downward, closing the port $c$ first, thus closing communication between the main air-pipe and the auxiliary reservoir and then opening the lower end of the passage F. During the downward movement of the piston D the spiral spring E', being compressed, will expand and assist materially in forcing the said piston downward, at least until after the port $c$ has been closed, after which the auxiliary-reservoir air-pressure will act with greater effect on the piston D. Now when the piston D is forced downward it not only opens the valve E, but also closes the exhaust-port K by means of slide-valve $d^2$, located on the upper end of the stem D'. Communication is now established from the auxiliary reservoir through port C', passage F, and port H to and through the governor-chamber J, the valve $L^2$ being opened by the pressure or tension of the spring $N^2$ on the top of the regulator-piston L, and from thence to the brake-cylinder. The air thus passes to the brake-cylinder until the pressure in the auxiliary reservoir is slightly less than the pressure which has been maintained in the main air-pipe. This slight excess of pressure in the main air-pipe now acts to shift or lift the piston D, and thus closes the lower end of passage F by means of valve E and cuts off communication between the auxiliary reservoir and the brake-cylinder. The valve E now remains in this position, with the port $c$ closed and also the valve E seated, the resistance of the spring E' preventing a further upward movement of the piston D until the main air-pipe is again charged with air from the main reservoir. Right here it will be noticed that the spring E' performs a threefold function.

First, it acts to keep the packing $e$ closely around the stem $D'$ and up into the top of the recessed valve E, thus preventing the escape of air; second, the spring $E'$ acts, as just hereinbefore set forth, to assist in the downward movement of the piston D and at the same time keeping the valve E to its seat, and, third, it acts to force the valve E to its seat upon the upward movement of the piston D before the exhaust-port K is opened, and thus cuts off communication between the auxiliary reservoir and the brake-cylinder before the said exhaust-port K is opened. The further reduction of air-pressure in the main air-pipe will again manipulate the piston D and the parts connected thereto and operated thereby, as hereinbefore described, and thus the pressure in the brake-cylinder is increased until the said pressure is sufficient to force the valve $L^2$ to its seat against the tension of spiral spring $N^2$, and thus cut off communication between the auxiliary reservoir and the brake-cylinder at this point. Thus it will be seen that the brakes can be set to any desired extent by the manipulation of the valve in the main air-pipe in the manner just described. When it is desired to release the brakes, the main air-pipe is again charged with air from the main reservoir, and the compressed air passes into chamber A and forces the piston D to its normal position, as shown in the drawings, and also shifts the slide-valve $d^2$, so as to open the exhaust-port K, and the air escapes from the brake-cylinder through ports $l$, H, and K, as hereinbefore described. At the same time the port $c$ is opened and the auxiliary reservoir again charged through the same. In case of an emergency where a quick stop is required, or, in other words, in case an emergency stop is required, the air in the main air-pipe is suddenly or quickly discharged therefrom and the force of the air in the auxiliary reservoir, acting upon the upper face of the piston D, drives said piston downward with great force and to the extreme limit of its downward movement, which acts to close the port $c$ between the main air-pipe and the auxiliary reservoir, and also to close the exhaust-port K and open the valve E, allowing the full charge of air to pass to the brake-cylinder from the auxiliary reservoir. At the same time communication is made between the passage F and the port G through slide-valve $d^2$ and the air passes to the space above the regulator-piston and acts, in conjunction with the spring $N^2$, to hold the valve $L^2$ open against back pressure from the brake-cylinder. This renders effective the full pressure in the auxiliary reservoir, or, in other words, takes in the excess pressure of said reservoir which is not nor cannot be used in a service or slow stop.

In order to gradually reduce the excess pressure in the brake-cylinder in case of an emergency stop, I have provided a suitable relief-valve O, hereinbefore described. This valve may be dispensed with, however, in cases where the braking power is less than one hundred per cent. of the weight of the vehicle.

What I claim is—

1. In an air-brake system, the combination with the valve mechanism operated by the air-pressure from the main air-pipe, of an auxiliary governing-valve, said governing-valve being located in the system between the valve operated by the main air-pressure and the brake-cylinder, said auxiliary valve governing the supply of air to the brake-cylinder and means for overcoming the back pressure from the brake-cylinder against said governing-valve, substantially as and for the purpose shown and described.

2. In an air-brake system, the combination with a valve operated by the main air-pressure and controlling the supply of air to the auxiliary reservoir, of an auxiliary governing-valve controlling the supply of air to the brake-cylinder, said valve being so constructed and operated as to be closed by the back pressure of the air from the brake-cylinder and to be normally held open by a spring and means for supplementing the action of the spring by air-pressure, substantially as and for the purpose shown and described.

3. In an air-brake system, the combination with a valve mechanism operated by the main air-pressure and controlling the supply of air from the main air-pipe to the auxiliary reservoir, of a slide-valve also operated by said valve mechanism and hence controlled by the main air-pressure, said slide-valve controlling in turn the opening and closing of a port leading to the upper part of a cylinder, and a governing-valve operating in said cylinder for the purpose of controlling the supply of air from the auxiliary reservoir to the brake-cylinder, the said valve in turn being thus held open by the pressure of air on its upper portion, substantially as and for the purpose shown and described.

4. A valve located in an air-brake system for controlling the supply of air to the brake-cylinder, said valve being held to its normal open position by a spring, and means substantially such as described for reinforcing the spring-pressure by means of air-pressure when the air is suddenly discharged from the main air-pipe, whereby the back pressure from the brake-cylinder is prevented from closing the governing-valve, substantially as and for the purpose shown and described.

5. In an air-brake system for railway-cars, the combination with the cylinder C, piston D and port $c$, of valve E, passage F controlled by said valve E, port H and cylinder J, said cylinder J communicating with the brake-cylinder and provided with a spring-pressed regulating-valve normally opened and adapted to be closed by the back pressure from said brake-cylinder when the air is slowly discharged from the main air-pipe and means for introducing air into the upper part of cylinder J, substantially as and for the purpose shown and described.

6. In an air-brake valve, the combination with the cylinder C and piston D operating therein, said piston in turn being controlled in its movement in said cylinder by the air-pressure in the main air-pipe, port or ports $c$ controlled by the piston D, port C' communicating with the auxiliary reservoir, valve E and passage F controlled by valve E, port H, cylinder J, piston L, valve $L^2$ spring $N^2$, passage G and valve $d^2$ all operating conjointly and substantially as and for the purpose shown and described.

7. In an air-brake system, the combination of the slide-valve $d^2$ controlling-port G and governor-chamber, said slide-valve $d^2$ being operated by the piston D whereby when the air is discharged suddenly from the main air-pipe, the port G will be opened and compressed air admitted to the upper part of the governor-chamber J, substantially as and for the purpose shown and described.

8. The combination with the valve operated by the main air-pressure, and controlling the supply of air to the auxiliary reservoir, of a valve E, passage F and discharge-port K, a governing-valve, a valve located in the lower end of the governing-valve, ports located in the governing-valve, whereby the air in the brake-cylinder is discharged through the port K.

9. A valve located in an air-brake system for controlling the supply of air to the brake-cylinder, said valve being held to its normal open position by a spring, and means substantially as described for reinforcing the spring-pressure by means of air-pressure when the air is suddenly discharged from the main air-pipe, whereby the back pressure from the brake-cylinder is prevented from closing the governing-valve, and a relief-valve to relieve the brake-cylinder of surplus air in case of an emergency stop.

In testimony whereof I sign this specification, in the presence of two witnesses, this 14th day of October, 1897.

THEODORE H. HABERKORN.

Witnesses:
LINDLEY M. NINDE,
ELIZABETH C. LINCOLN.